Jan. 5, 1971     M. PAGE     3,553,033

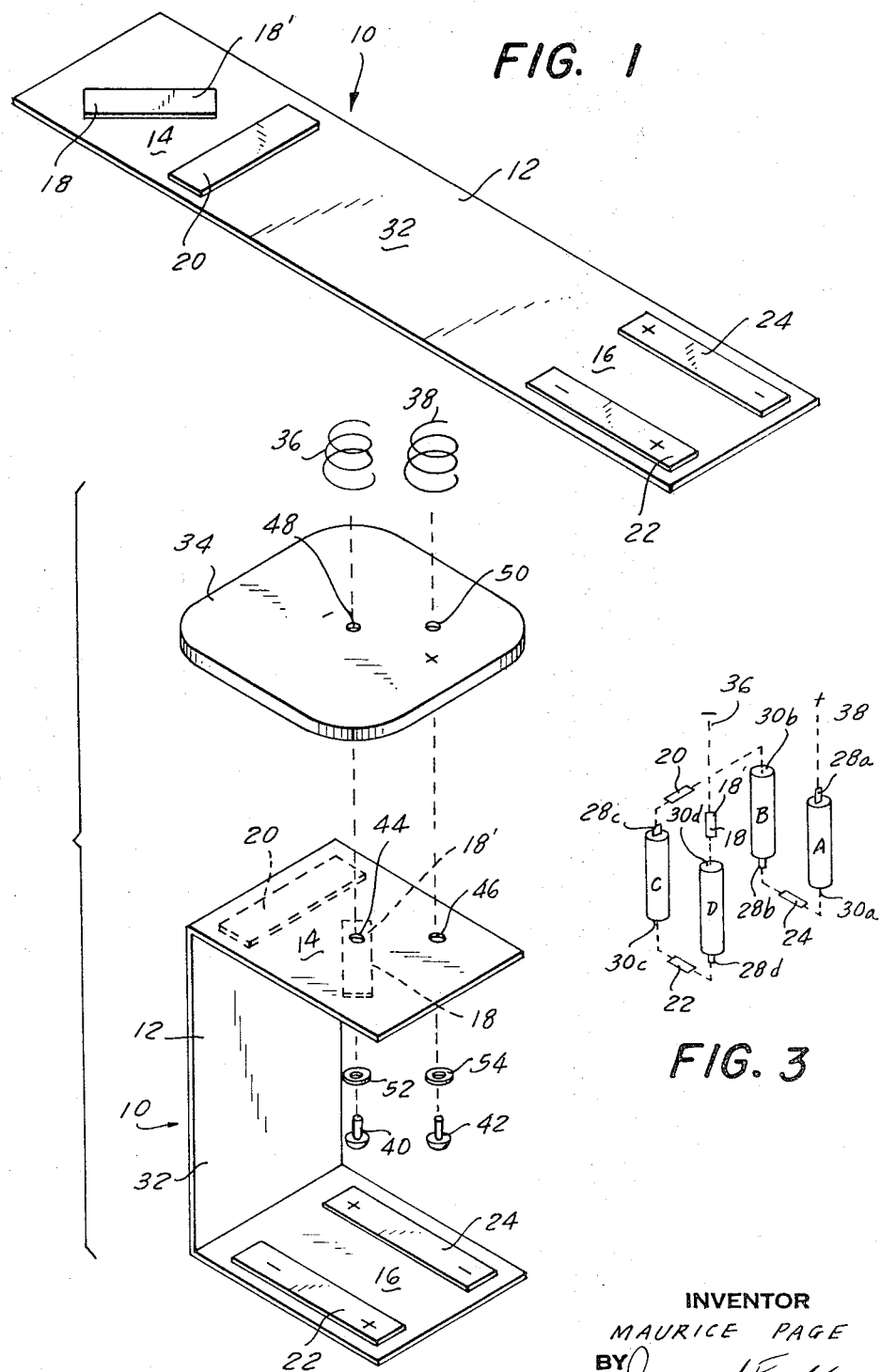

PRINTED CIRCUIT LANTERN BATTERY CONSTRUCTION

Filed Aug. 23, 1968     2 Sheets-Sheet 2

INVENTOR
MAURICE PAGE
BY Jameson Franklin
ATTORNEY

United States Patent Office 3,553,033
Patented Jan. 5, 1971

3,553,033
PRINTED CIRCUIT LANTERN
BATTERY CONSTRUCTION
Maurice Page, Lake Hiawatha, N.J., assignor to Bright Star Industries, Inc., Clifton, N.J., a corporation of Delaware
Filed Aug. 23, 1968, Ser. No. 754,897
Int. Cl. H01n 1/04
U.S. Cl. 136—132                                13 Claims

ABSTRACT OF THE DISCLOSURE

A printed circuit for connecting a plurality of dry cells having upper and lower terminals, the circuit being in the form of a flexible sheet of insulating material which extends along the side and across the top and bottom of the cells, conductive cell-terminal-engaging strips being provided on those portions of the sheet which extend across the top and bottom of the cells, thereby to connect the batteries in a predetermined circuit arrangement. That sheet portion extending across the top of the cells may be secured to the top cover of the battery assembly.

---

The present invention relates to a printed circuit for connecting a plurality of galvanic or dry cells in a predetermined circuit arrangement, and to a battery assembly in which it is used.

Hand-carried lanterns have found wide-spread use, particularly for emergency purposes and in outdoor activities such as camping, as a result of the high intensity of the light beam which they are able to produce. They generally comprise a battery assembly comprising a housing in which the dry cells producing the electrical energy for the light source are received, and a lamp assembly having its terminals electrically connected to the dry cells and carried in a suitable structure operatively secured to the battery assembly. To produce the high intensity light beam and to permit the lantern to be used for relatively long periods without replacing the dry cells, a plurality of such dry cells are connected in a predetermined circuit arrangement, usually in series in voltage-adding relation, so as to develop the desired voltage level. Various means have been used to provide that electrical connection. They are in general functionally satisfactory, but they have certain disadvantages. Fabrication is costly and assembly is difficult, particularly in insuring that electrical connection between the cells is made in the proper circuit sequence and polarity, thus necessitating the use of relatively highly skilled assembly personnel. In addition, the security of the electrical connections under adverse environmental conditions such as moisture and shock leaves much to be desired.

Lanterns of this type are generally relatively low-priced and are produced in large quantities. They are formed from a relatively small number of component parts, and hence a reduction in the cost of fabrication of any one of these components, and in the cost of assembling the components, will result in a significant reduction in the overall production cost of the latern and thus increase both the sales of the product, due to the reduced retail cost to the consumer, and the profits derived by the manufacturer from such sales.

It is a prime object of the present invention to provide a printed circuit for use in connecting a plurality of dry cells which is inexpensive to fabricate, which greatly simplifies making electrical connection to the cells, and which provides a secure and reliable electrical connection when once made between the cells.

It is a further object of the present invention to provide a printed circuit of the type described in which the assembly and connection of the dry cells in their container is readily achieved both at the point of initial installation and by the user when replacement of the dry cells is called for.

It is yet a further object of the present invention to provide a printed circuit for use in connecting selected terminals of a plurality of dry cells in a predetermined manner in which the electrical connection is physically secured and in which the possibility of the formation of short circuits between dry cell terminals is substantially eliminated.

It is another object of the present invention to provide a unitary printed circuit and cover pad assembly which is readily installed in position in a dry cell container, and serves to electrically connect the dry cells in the container, and to form a top cover for the container.

To these ends the printed circuit of the present invention is in the form of a flexible sheet of insulating material adapted to be received in the battery assembly housing and to be there arranged under the bottom, along the side, and over the tops of the group of dry cells. First and second conducting means are operatively secured to the cell-facing surface of that sheet near opposite ends thereof at those portions of the strip adapted to extend under the bottom and over the top of the cell assembly, and are spaced and thereby insulated from one another on the sheet. The first conducting means is adapted to contact the upper terminals of adjacent cells and the second conducting means is adapted to similarly contact the lower terminals of adjacent cells, thereby to connect the cells in a predetermined circuit arrangement.

A relatively rigid pad carrying two spaced electrical terminals on its upper surface is secured to one end of the sheet and preferably overlies that sheet portion carrying the conductive means, at least one of these terminals being electrically connected to that conducting means. Preferably that terminal is secured to the sheet by structure which also serves to provide the described electrical connection. The pad may serve as a cover for the battery assembly per se.

The conducting means are in the form of strips of conducting material. When four cells are involved in a given battery assembly, as is common in commercial lanterns, each conducting means comprises a pair of separated conductive strips. One such pair of strips may be substantially parallel, while the other pair of strips, preferably the one at the end carrying the cover pad, is non-parallel.

The container in which the dry cells are housed and in which the printed circuit sheet is placed may have on its bottom wall a plurality of resilient protrusions or dimples which are effective to urge the conducting strips at the lower end of the sheet up against the bottom terminals of the dry cells, thereby to provide a more secure electrical connection at these terminals. The flexible sheet may be coated with polyethylene on the surface thereof which carries the conducting strips so as to provide for improved insulation between the strips, better adherence of the strips to the paper, and a lessened tendency for conductive bridging between the conducting strips in the presence of moisture.

To the accomplishment of the above, and to such other objectives as may hereinafter appear, the present invention relates to the construction of a printed circuit and of the battery assembly in which it is used, as defined in the appended claims and as described in this specification, taken together with the accompanying drawings, in which:

FIG. 1 is a perspective view of the printed circuit of this invention;

FIG. 2 is an exploded view in perspective of the printed circuit of FIG. 1, illustrating the manner in which the cover pad is secured to one end thereof;

FIG. 3 is a schematic drawing indicating the electrical circuit arrangement provided between the dry cells by the printed circuit of FIG. 1;

Figure 5:
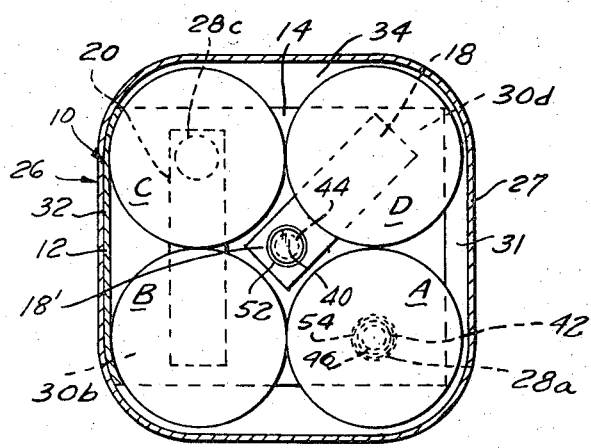
FIG. 5 is a cross-sectional view taken along the line of 5—5 of FIG. 4.

A printed circuit generally designated 10, embodying the essential features in this invention, is illustrated in FIG. 1 and comprises a flexible sheet of insulating material such as kraft paper 12, having a thickness, for example, of .006 inch. The sheet 12 has a pair of conducting means 14 and 16 operatively secured to one of its surfaces adjacent one and the other end of the sheet respectively. Conducting means 14 comprises a pair of nonparallel strips 18 and 20 of conducting material secured to sheet 12 in any appropriate manner. Conducting means 16 comprises two spaced parallel strips 22 and 24 of conducting material. A thin layer of polyethylene (e.g. 1 mil thick) is preferably coated on that surface of sheet 12 to which the conducting strips 18-24 are secured. The strips 18-24 may be self-sustaining and pre-formed, held in place on the sheet 12 by adhesive, or they may be true printed circuits defined by a conductive paste, for example, which is sustained and held in shape by the paper sheet 12, or may take any other of the forms which make up the printed circuit art.

Figure 4:
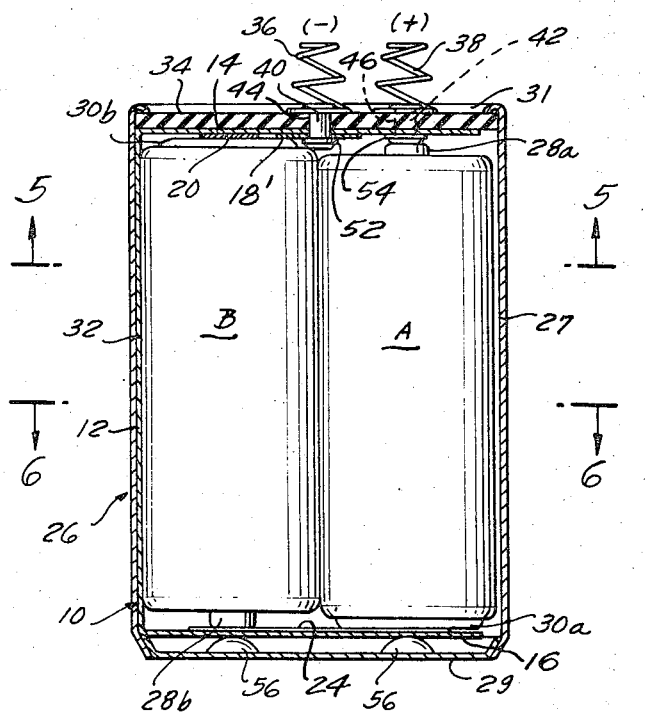
FIG. 4 is a vertical section taken through a battery assembly in which the printed circuit of FIG. 1 is used to interconnect a plurality of dry cells.
Figure 6:
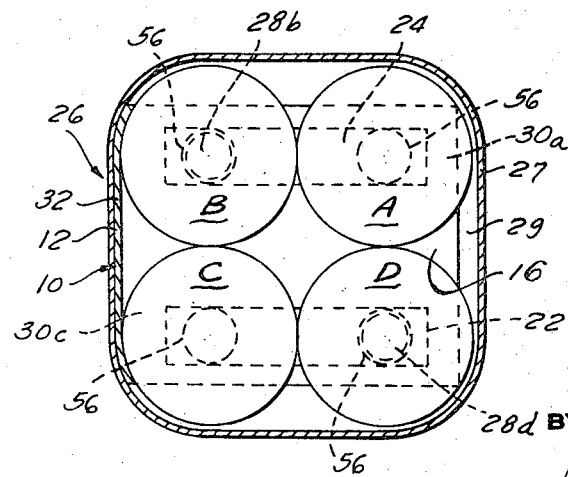
FIG. 6 is a cross-sectional view taken along the line of 6—6 of FIG. 4.

The use of the printed circuit 10 of this invention to electrically connect a plurality of dry cells housed within a hollow metallic container 26 in a predetermined circuit arrangement is illustrated in FIGS. 4-6. The container 26 comprises a casing of metal, having side walls 27, a metal bottom wall 29, and an open upper end 31. Within this container 26 is a group of dry cells, here shown as four in number designated A, B, C and D respectively. Dry cells A-D are typically of the 1.5 volt type, each having a positive terminal or anode 28 at one end and a negative terminal or cathode 30 at the other end. Adjacent ones of the dry cells are arranged in reverse polarity orientation with respect to one another. For example, dry cell A is arranged within container 26 in a manner such that its positive terminal 28a is located at the upper open end of container 26, and its negative terminal 30a is arranged at the bottom end of the container, and cell B, placed directly adjacent to cell A, has its positive terminal 28b located at the bottom end of container 26, while its negative terminal 30b is located at the upper end of the container. Cell C has its positive terminal 28c up and its negative terminal 30c down, while cell D has its positive terminal 28d down and its negative terminal 30d up. All this is best shown diagrammatically in FIG. 3.

The end of section of sheet 12 carrying conducting means 16 is adapted to be placed on the bottom wall 29 of container 26 between that wall 29 and the underside of the group of dry cells A-D so that conducting strip 24 makes electrical contact with the positive terminal 28b of cell B and the negative terminal 30a of cell A. The other conducting strip 22 of conducting means 16 contacts positive terminal 28d of dry cell D and negative terminal 30c of cell C.

The central section of sheet 12, that is, the section 32 located between the end sections carrying conducting means 14 and 16 respectively, comprises only insulating material and no conducting means. It extends between the vertical sides of cells B and D and one side wall 27 of container 26.

The other end section of sheet 12 carries conducting means 14 comprising strips 18 and 20. It overlies the upper terminals of the cells in a manner such that conducting strip 18 contacts the negative terminal 30d of cell D, and strip 20 connects the positive terminal 28c of cell C and the negative terminal 30b of cell B. The equivalent circuit thus formed by the interconnections of cells A-D by the conducting strips 18-24 of printed circuit 10 is shown in FIG. 3, which indicates a series connection of the four cells having an end positive terminal located at anode 28a of cell A and an end negative terminal located at the end 18' of strip 18, that is, the portion of strip 18 extending beyond its contact area with the negative terminal 30c of cell C.

A rigid pad 34 is utilized to close the open top 31 of the container 26. It is formed of insulating material and carries on its upper surface of pair of electrical terminals 36 and 38. It is secured to sheet 12 of printed circuit 10 and overlies the end section of the sheet 12 carrying the conducting means 14, sheet 12 and pad 34, thus constituting a unitary assembly. Means are also provided to electrically connect terminals 36 and 38 to the end terminals of the circuit of FIG. 3.

For this purpose, pad 34 is secured to one end section of sheet 12 by a pair of conductive rivets 40 and 42, which also engage terminals 36 and 38 respectively so as to secure the terminals to the exposed upper surface of pad 34. The rivet 40 passes through registering openings 44 and 48 in conducting strip 18 and sheet 12, and pad, 34, respectively, and engages strip 18, and thus is effective to electrical connect terminal 36 and conducting strip 18. Rivet 42 passes through registering openings 46 and 50 in sheet 12 and pad 34 respectively, and has its head portion insulated from both conducting strips 18 and 20. If desired, a pair of washers 52 and 54 may be interposed between the rivets 42 and 44 and the surface of sheet 12 carrying conducting means 14.

In use, the unitary assembly formed by the securing of pad 34 to sheet 12 is associated with the container 26. First, the lower end section carrying conducting means 16 is placed on the bottom wall 29 of the container, with conducting strips 22 and 24 being exposed at the upper surface of sheet 12, while the sheet section 32 extends along a side wall 27 and the sheet upper end section with pad 34 secured thereto is swung to one side, exposing the open casing end 31. The cells A-D are then placed into the container, making certain that the upper end lower terminals of adjacent cells are of mutually opposite polarity and preferably that the lower terminals of the cells are of the proper polarity with respect to the polarity markings inscribed on the conducting strips 22 and 24 (FIGS. 1 and 2). This will insure that the resulting polarity terminals 36 and 38 will be as marked on the upper surface of pad 34 (FIG. 2) when the cells are interconnected.

The upper end section of sheet 12 carrying conducting means 14 and pad 34, is then moved to overlie the upper terminals of the cells so that conducting strip 18 and 22 contact the upper terminals as described above, pad 34 thereupon overlying the sheet section and the cells and defining an upper cover for the previously open container 26 (FIG. 4). The upper container end may be spun over, as shown in FIG. 4, to secure the parts in assembled condition.

In the arrangement of the printed circuit 10 and the cells A-D specifically described herein, the cells A-D will thus be connected in a series circuit as described above. Rivet 42 will directly contact the anode 28a of the cell A, thus electrically connecting terminal 38 to the positive end terminal of the series circuit. Rivet 40 serves to electrically connect terminal 36 to conducting strip 18 and thus to the negative end terminal of that series circuit. The polarities of terminals 36 and 38 would be reversed by altering the relative polarities of the cells as they are inserted into container 26.

The bottom wall of container 26 desirably is provided with a plurality of resilient protrusions or dimples 56 (FIG. 4) which engage the underside of sheet 12 at the end section carrying the conducting means 16 and are preferably in registry with conducting strips 22 and 24 and with the terminals of the cells A-D with which these strips are in electrical contact. As a result, when the upper end of the container is spun over it acts to press pad 34 downwardly, thereby to force cells A–D downwardly against the resilient dimples 56 to compress the latter. Hence a resilient force is produced which urges the conducting strips 22 and 24 into secure and intimate engagement with the lower terminals of cells A–D, and also serves to press conducting strips 18 and 20 against the upper terminals of the cells.

Thus, the present invention has provided a printed circuit which can be inexpensively fabricated and which may be easily arranged within a container to reliably electrically connect a plurality of dry cells housed in that container in a predetermined circuit arrangement. The proper polarity of the external terminals is readily insured by placing the dry cells into the container so that their lower terminals correspond to indicia clearly visible on the conducting strips on the lower end of the sheet. This procedure is well within the capabilities of unskilled workers. The sheet carrier for the printed circuit may readily be secured to the cover pad for the container to form a subassembly which is readily manipulated, which may itself serve to instruct the assembler as to the specific manner in which the individual dry cells should be oriented, and which therefore greatly reduces the cost of assembly and increases speed of production.

The interposition of the lower sheet section between the cells and the metal bottom wall 29 of the casing 26 constitutes an exceptionally inexpensive way of permitting the use of a metallic bottom wall without short-circuiting the cells.

The electrical connection between the dry cells provided by the printed circuit of this invention has a high degree of reliability, intensified by the forces exerted by the resilient dimples provided in the bottom wall of the container. The dimples 56, by registering with the axes of the cells A–D, keep them from tilting and short-circuiting between their central terminals 28 and their outer rims.

The coating of the insulating sheet with polyethylene on its surface to which the conducting strips are secured, provides for better insulation between the conducting strips and improved adherence of these strips to the paper sheet. Furthermore, the polyethylene coating lessens the possibility of short circuiting or conductive bridging between the strips in the presence of dampness.

While the invention has been specifically disclosed herein as connecting a plurality of dry cells in series, it can readily be varied in the placement of the conducting strips and the cells, to connect the cells in parallel if increased current supply rather than increased voltage is desired. Furthermore, the relative orientation of the conducting strips on sheet 12 may also be varied in accordance with modifications in the dry cell placement or to interconnect a greater or lesser number of dry cells. Other variations will be apparent to those skilled in the art, all within the scope of the present invention as defined in the following claims:

I claim:

1. In combination with a container a plurality of galvanic cells received therein, said cells each having upper and lower terminals of opposite polarity, a single sheet of flexible, insulating material arranged under the bottom, along the sides and over the tops of said cells, and first and second conducting means operatively secured to one surface of said sheet near opposite ends of said sheet and spaced and thereby insulated from one another by means of said insulating material, said first conducting means contacting said upper terminals of adjacent ones of said cells, and second conducting means contacting said lower terminals of adjacent ones of said cells, thereby to interconnect said cells in a predetermined circuit arrangement.

2. In combination with the sheet of claim 1, a relatively rigid pad carrying first and second spaced electrical terminals thereon and overlying said end of said sheet carrying said first conducting means, said first terminal being operatively electricaly connected to said first conducting means, an means for securing said sheet to the under side of said pad.

3. The combination of claim 2, said securing means comprising means for electrically connecting said first conducting means to said first terminal.

4. The combination of claim 3, in which said second electrical terminal is electrically insulated from said first conducting means and comprises a conducting member secured to said sheet and adapted to directly engage the upper terminal of one of the cells.

5. The sheet of claim 1, in which said first and second conductive means each comprise a pair of spaced strips of conducting material, insulated from one another by said insulating material.

6. The sheet of claim 5, in which said first conducting means comprises two non-parallel strips of conducting material, and said second conducting means comprises two substantially parallel strips of conducting material.

7. In combination with the sheet of claim 6, a relatively rigid pad carrying first and second spaced electrical terminals thereon and overlying said end of said sheet carrying said first conducting means, said first terminal being operatively electrically connected to said first conducting means, and means for securing said sheet to the underside of said pad.

8. The combination of claim 7, in which said securing means comprises means for electrically connecting said first conducting means to said first terminal.

9. The sheet of claim 1, in which said sheet is paper coated with polyethylene on the surface thereof upon which said conducting means are secured.

10. The sheet of claim 9, in which said first and second conducting means each comprise a pair of spaced strips of conducting material insulated from one another by said insulating material.

11. The sheet of claim 10, in which said first conducting means comprises two non-parallel strips of conducting material, and said second conducting means comprises two substantially parallel strips of conducting material.

12. The combination of claim 1, wherein said container comprises a bottom wall having resilient protrusions adapted to operatively engage and support the lower ends of the cells, said protrusions thereby comprising means effective to urge said cells against said second conducting means.

13. The combination of claim 12, in which said protrusions are in substantial registry with and directly engage said second conducting means.

References Cited

UNITED STATES PATENTS

| | | | |
|---|---|---|---|
| 509,381 | 11/1893 | Jordan | 136—173(.11) |
| 2,058,755 | 10/1936 | Arnesen | 136—173(.12) |
| 2,522,660 | 9/1950 | Bledsoe, Jr. | 240—10.68 |
| 2,695,351 | 11/1954 | Beck | 338—254 |
| 2,721,152 | 10/1955 | Hopf et al. | 117—212 |
| 2,876,393 | 3/1959 | Tally et al. | 317—101 |
| 2,955,970 | 10/1960 | Rice et al. | 117—76(P)X |
| 2,963,538 | 12/1960 | Dahlgren | 174—68.5X |
| 2,975,074 | 3/1961 | Jankins et al. | 117—76(P) |
| 3,221,286 | 11/1965 | Fedde | 339—17(F) |
| 3,237,341 | 3/1966 | Janning | 35—19(.1)X |

MARVIN A. CHAMPION, Primary Examiner

P. A. CLIFFORD, Assistant Examiner

U.S. Cl. X.R.

117—212, 218; 136—173; 339—17